United States Patent
Deng et al.

(10) Patent No.: US 10,608,946 B2
(45) Date of Patent: Mar. 31, 2020

(54) DATA FLOW PROCESSING METHOD AND APPARATUS FOR DATA FLOW SYSTEM

(71) Applicant: BEIJING BAIDU NETCOM SCIENCE AND TECHNOLOGY CO., LTD., Beijing (CN)

(72) Inventors: Chengliang Deng, Beijing (CN); Wei He, Beijing (CN); Kaiwen Feng, Beijing (CN); Yu Ma, Beijing (CN); Bocong Liu, Beijing (CN); Zhuo Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 175 days.

(21) Appl. No.: 15/410,629

(22) Filed: Jan. 19, 2017

(65) Prior Publication Data
US 2018/0077069 A1    Mar. 15, 2018

(30) Foreign Application Priority Data
Sep. 12, 2016  (CN) .......................... 2016 1 0816507

(51) Int. Cl.
| | | |
|---|---|---|
| *H04L 12/851* | (2013.01) | |
| *G06F 9/448* | (2018.01) | |
| *H04L 12/24* | (2006.01) | |
| *H04L 12/833* | (2013.01) | |
| *H04L 29/08* | (2006.01) | |

(52) U.S. Cl.
CPC ........ *H04L 47/2441* (2013.01); *G06F 9/4494* (2018.02); *H04L 41/0893* (2013.01); *H04L 47/31* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2011/0268125 | A1* | 11/2011 | Vobbilisetty | ............ H04L 45/46 370/395.53 |
| 2012/0177039 | A1* | 7/2012 | Berman | .................. H04L 45/02 370/390 |

(Continued)

FOREIGN PATENT DOCUMENTS

| | | | | |
|---|---|---|---|---|
| CN | 105429825 | | 3/2016 | |
| JP | 5540706 | B2 * | 7/2014 | ............. G06F 15/16 |

*Primary Examiner* — Donald L Mills
(74) *Attorney, Agent, or Firm* — Lathrop GPM LLP

(57) ABSTRACT

The present application discloses a data flow processing method and apparatus for a data flow system. A specific implementation of the method includes: acquiring a to-be-processed data flow, and determining, according to a data flow processing instruction, at least one data flow processing node corresponding to the to-be-processed data flow and a passing order in which the to-be-processed data flow passes through the at least one data flow processing node; and connecting together the at least one data flow processing node according to the passing order to obtain a data flow processing channel, and importing the to-be-processed data flow to the data flow processing channel for data processing. This implementation improves the utilization of data flow processing nodes and the data flow processing efficiency.

7 Claims, 5 Drawing Sheets

(56) References Cited

U.S. PATENT DOCUMENTS

| | | | |
|---|---|---|---|
| 2012/0243539 A1* | 9/2012 | Keesara | H04L 45/66 370/392 |
| 2014/0029412 A1* | 1/2014 | Janardhanan | H04L 45/66 370/221 |
| 2015/0158499 A1* | 6/2015 | Koravadi | B60T 7/12 701/23 |
| 2017/0129335 A1* | 5/2017 | Lu | B60K 28/066 |
| 2017/0269561 A1* | 9/2017 | Wood | G05B 17/02 |
| 2019/0028783 A1* | 1/2019 | Clucas | H03M 7/00 |

* cited by examiner

DATA FLOW PROCESSING METHOD AND APPARATUS FOR DATA FLOW SYSTEM

CROSS REFERENCE TO RELATED APPLICATIONS

This application claims the priority of Chinese Patent Application No. 201610816507.3, entitled "Data Flow Processing Method and Apparatus for Data Flow System," filed on Sep. 12, 2016, the content of which is incorporated herein by reference in its entirety.

TECHNICAL FIELD

The present application relates to the field of data processing technology, specifically to the field of data transmission technology, and more specifically to a data flow processing method and apparatus for a data flow system.

BACKGROUND

Automobiles extend people's travel range, provide travel convenience to people and improve people's quality of life. With the development and progress of science and technology, driverless vehicles controlled by intelligent systems have become an important trend in future automobile development because they can acquire more driving information than manned vehicles and have higher security.

Driverless vehicles use a robot operating system to perform information transmission, and rely on the collaboration of an artificial intelligence module, a visual computing module, a video camera module, a radar sensor module, a laser radar module, and a Global Positioning System (GPS) module, so that the driverless vehicles can automatically and safely travel with no assistance.

However, there are still some shortcomings in processing the data flow in the existing driverless vehicles. The driverless vehicle may be considered as a data flow system that includes data flow processing nodes for implementing respective functions, and a plurality of data flow processing nodes may constitute a program for processing the data flow. In practice, if a data flow processing node needs to be used to process a data flow, the entire program will be started, which causes data flow processing nodes in the program that do not need to participate in the data flow processing being undesirably started, lowering the utilization ratio of data flow processing nodes. In addition, during a driverless vehicle commissioning process, the type, number, or connection relationship of data flow processing nodes often needs to be adjusted, which makes the connection relationship of data flow processing nodes complex, easily leading to low data flow processing efficiency problems.

SUMMARY

The present application provides a data flow processing method and apparatus for a data flow system, so as to solve the technical problem mentioned in the forgoing Background section.

According to a first aspect, the present application provides a data flow processing method for a data flow system, the data flow system comprising a set of data flow processing nodes for processing a data flow, and the data flow entering a data flow processing node in the set of data flow processing nodes acting as an entrance and exiting the data flow system after passing through at least one data flow processing node in the set of data flow processing nodes, the data flow processing method comprising: acquiring a to-be-processed data flow, and determining, based on a data flow processing instruction, at least one data flow processing node corresponding to the to-be-processed data flow and a passing order in which the to-be-processed data flow passes through the at least one data flow processing node, the data flow processing node converting the data flow into a designated data flow, and the data flow processing instruction instructing to convert the to-be-processed data flow into a target data flow; and connecting together the at least one data flow processing node according to the passing order to obtain a data flow processing channel, and importing the to-be-processed data flow to the data flow processing channel for data processing.

In some embodiments, the determining, based on the data flow processing instruction, the at least one data flow processing node corresponding to the to-be-processed data flow comprises: acquiring a data flow processing instruction corresponding to the to-be-processed data flow; and determining the data flow processing node according to a target data flow based on the data flow processing instruction.

In some embodiments, the determining, based on the data flow processing instruction, the passing order in which the to-be-processed data flow passes through the at least one data flow processing node comprises: determining at least one data flow processing procedure from the to-be-processed data flow to the target data flow, the data flow processing procedure being used for converting the to-be-processed data flow into the designated data flow; and determining, based on the data flow processing procedure, the passing order in which the to-be-processed data flow passes through the at least one data flow processing node.

In some embodiments, the method further comprises: setting a data flow guiding flag bit for the data flow processing node, the setting the data flow guiding flag bit for the data flow processing node comprising: setting a data flow input guiding flag bit and a data flow output guiding flag bit respectively at a data input port and a data output port of the data flow processing node, the data flow input guiding flag bit being used for indicating description information of the data flow processing node, and the data flow output guiding flag bit being used for querying the description information of the data flow processing node.

In some embodiments, the connecting together the at least one data flow processing node according to the passing order to obtain a data flow processing channel comprises: connecting together data flow processing nodes corresponding to the data flow processing procedure using the data flow guiding flag bit according to the passing order to obtain the data flow processing channel.

According to a second aspect, the present application provides a data flow processing apparatus for a data flow system, wherein the data flow system comprising a set of data flow processing nodes for processing a data flow, and the data flow entering a data flow processing node in the set of data flow processing nodes acting as an entrance and exiting the data flow system after passing through at least one data flow processing node in the set of data flow processing nodes, the apparatus comprising: a data flow processing node determining unit, for acquiring a to-be-processed data flow, and determining, based on a data flow processing instruction, at least one data flow processing node corresponding to the to-be-processed data flow and a passing order in which the to-be-processed data flow passes through the at least one data flow processing node, the data flow processing node converting the data flow into a designated data flow, and the data flow processing instruction instructing to convert the to-be-processed data flow into a target data flow; and a data flow processing channel constructing unit, for connecting together the at least one data flow processing node according to the passing order to obtain a data flow processing channel, and importing the to-be-processed data flow to the data flow processing channel for data processing.

In some embodiments, the data flow processing node determining unit comprises: a data flow processing instruction acquiring subunit, for acquiring a data flow processing instruction corresponding to the to-be-processed data flow; and a data flow processing node determining subunit, for determining the data flow processing node based on a target data flow corresponding to the data flow processing instruction.

In some embodiments, the data flow processing node determining unit comprises: a data flow processing procedure determining subunit, for determining at least one data flow processing procedure from the to-be-processed data flow to the target data flow, the data flow processing procedure being used for converting the to-be-processed data flow into the designated data flow; and a data flow processing node determining subunit, for determining, based on the data flow processing procedure, the passing order in which the to-be-processed data flow passes through the at least one data flow processing node.

In some embodiments, the apparatus further comprises: a data flow guiding flag bit setting unit, for setting a data flow guiding flag bit for the data flow processing node, the data flow guiding flag bit setting unit comprising: a data flow guiding flag bit setting subunit, for setting a data flow input guiding flag bit and a data flow output guiding flag bit respectively at a data input port and a data output port of the data flow processing node, the data flow input guiding flag bit being used for indicating description information of the data flow processing node, and the data flow output guiding flag bit being used for querying the description information of the data flow processing node.

In some embodiments, the data flow processing channel constructing unit comprises: a data flow processing channel constructing subunit, for connecting together data flow processing nodes corresponding to the data flow processing procedure using the data flow guiding flag bit according to the passing order to obtain the data flow processing channel.

According to the data flow processing method and apparatus for a data flow system that are provided by the present application, first, at least one data flow processing node for a data flow to be processed and a passing order in which the data flow to be processed flows through the at least one data flow processing node are determined; then, the at least one data flow processing node is connected together according to the passing order to obtain a data flow processing channel. In this way, corresponding data flow processing nodes can be connected based on the requirements of the data flow to be processed, thereby improving the utilization of data flow processing nodes and the data flow processing efficiency.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention.

In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
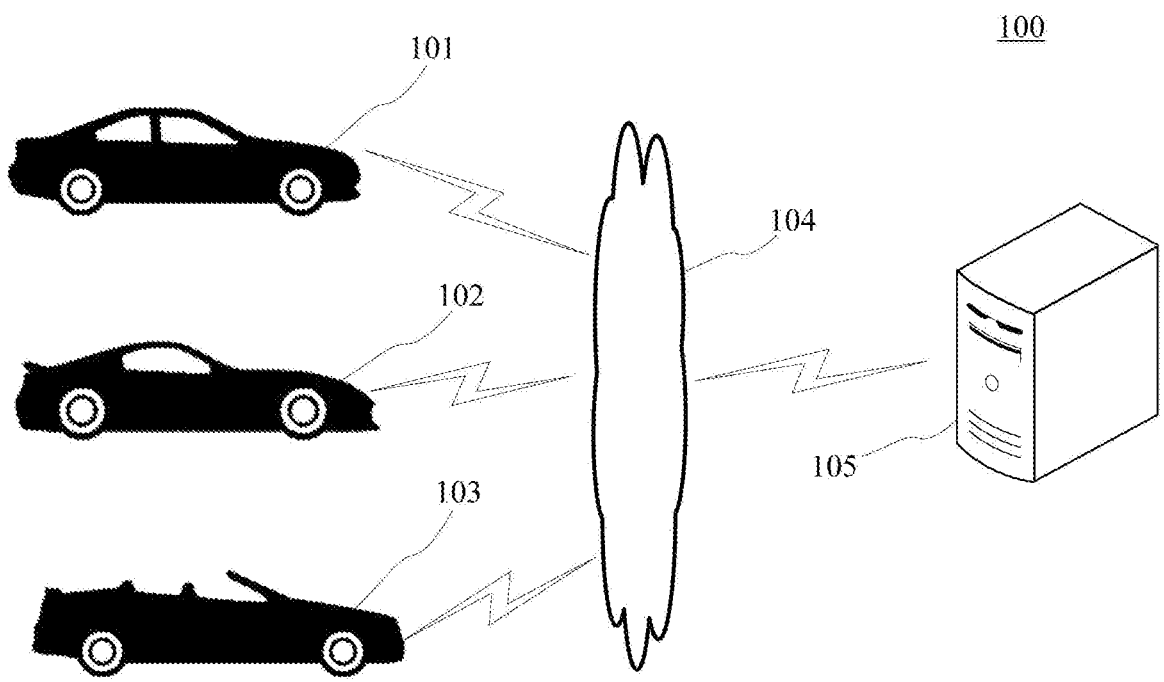
FIG. 1 is an architectural diagram of an exemplary system in which the present application may be implemented.

FIG. 1 shows exemplary system architecture 100 to which a data flow processing method or apparatus for a data flow system according to an embodiment of the present application may be implemented.

As shown in FIG. 1, the system architecture 100 may include driverless vehicles 101, 102, and 103, a network 104, and a server 105. The network 104 serves as a medium for providing communication links between the driverless vehicles 101, 102, and 103 and the server 105. The network 104 may include various types of connections, such as wired and wireless communication links or optical fiber cables.

The driverless vehicles 101, 102, and 103 interact with the server 105 through the network 104 to receive or send data flows, etc. Various data flow processing applications, for example, a position information application, a speed control application, a radar ranging application, a temperature control application, and a communication application, may be installed on the driverless vehicles 101, 102, and 103. The driverless vehicles 101, 102, and 103 may analyze an acquired data flow to be processed, determine corresponding data flow processing nodes for processing the data flow to be processed, and construct a data flow processing channel using the data flow processing nodes.

The driverless vehicles 101, 102, and 103 may be various vehicles having a display screen and a program debugging function, including, but not limited to, electric vehicles, hybrid electric vehicles, internal combustion engine vehicles, and so on.

The server 105 may be a server for processing data flows from the driverless vehicles 101, 102, and 103, for example, a server that determines a data flow processing channel based on obtained data flows to be processed from the driverless vehicles 101, 102, and 103. The server 105 may analyze the obtained data flows to be processed, determine data flow processing nodes for processing the data flows to be processed, and construct a data flow processing channel using the data flow processing nodes.

It should be noted that the data flow processing method for a data flow system provided by the embodiments of the present application may be executed independently by the driverless vehicles 101, 102, and 103, or may be executed jointly by the driverless vehicles 101, 102, and 103 and the server 105. Generally, the data flow processing method for the data flow system is executed by the driverless vehicles 101, 102, and 103. Correspondingly, a data flow processing apparatus for a data flow system may be provided in the driverless vehicles 101, 102, and 103, or may be provided in the server 105.

It should be appreciated that the number of the driverless vehicles, networks, and servers in FIG. 1 are merely illustrative. Any number of driverless vehicles, networks, and servers may be provided according to actual requirements.

Figure 2:
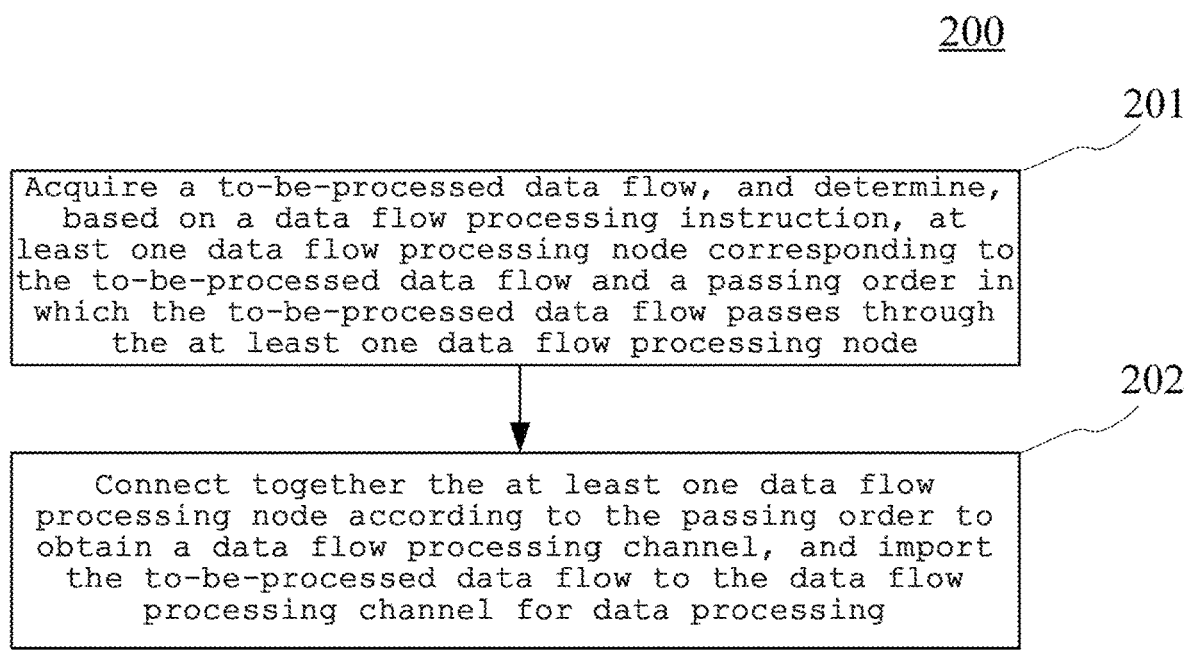
FIG. 2 is a flow chart of a data flow processing method for a data flow system according to an embodiment of the present application.

FIG. 2 shows a flow 200 of a data flow processing method for a data flow system according to an embodiment of the present application. The data flow processing method includes:

Step 201, acquire a data flow to be processed, and determine, based on a data flow processing instruction, at least one data flow processing node corresponding to the above-mentioned data flow to be processed and a passing order in which the above-mentioned data flow to be processed passes through the above-mentioned at least one data flow processing node.

In this embodiment, an electronic device (for example, the driverless vehicle or the server shown in FIG. 1) on which the data flow processing method for the data flow system runs may acquire a data flow to be processed from a driverless vehicle by means of a wired connection or a wireless connection. The above-mentioned data flow to be processed may include various data flows to be processed that are acquired by various sensors, for example, position data acquired by a GPS, data acquired by an inertial navigation system, distance data acquired by a radar, and temperature data acquired by a temperature sensor.

The data flow system of this embodiment includes a set of data flow processing nodes used for processing a data flow, and the above-mentioned data flow enters a data flow processing node in the set of data flow processing nodes acting as an entrance and exits the above-mentioned data flow system after passing through at least one data flow processing node in the set of data flow processing nodes. The data flow processing node of the data flow system may be hardware or software, or even a function in software.

The data flow to be processed is generally raw data that is directly acquired by a sensor, and includes various interfering signals. After the data flow to be processed is acquired, the data flow to be processed needs to be processed, so as to convert the data flow to be processed into data that can be directly used by other programs or devices. Alternatively, the data flow to be processed may be non-raw data, and to obtain a target data flow from the data flow to be processed, a corresponding data flow processing node also needs to be determined. The above-mentioned data flow processing node is used for converting the above-mentioned data flow to be processed into a designated data flow. To determine the data flow processing node corresponding to the data flow to be processed, data processing to be performed on the data flow to be processed needs to be determined first. Generally, the data flow processing node is determined based on a data flow processing instruction corresponding to the data flow to be processed. The above-mentioned data flow processing instruction is used for instructing to convert the above-mentioned data flow to be processed into the target data flow. There is a correlation between the data flow processing instruction and the data flow to be processed. For example, when the data flow to be processed is raw data acquired by a sensor, the data flow processing instruction may be performing processing such as filtering and rectification on the raw data, to convert the raw data into a target data flow that is free of interfering signals and has a stable waveform. Different data flows to be processed correspond to different data flow processing instructions, which will not be described in detail herein.

It should be noted that to convert a data flow to be processed into a target data flow, generally a plurality of data flow processing nodes are needed. Each data flow processing node may output respective designated data flow, and a plurality of data flow processing nodes may be combined to convert the data flow to be processed into a desired target data flow. For example, after the raw data (that is, the data flow to be processed) of a temperature sensor is acquired, processing such as filtering and rectification needs to be performed on the raw data, so as to obtain data (the target data flow) that can be used by other programs. Each processing needs to be implemented by a corresponding data flow processing node, and the data flow processing nodes respectively implement processing such as filtering and rectification, so as to finally obtain the target data flow.

The data flow processing node of this embodiment is used for implementing a specific step in the process of processing the data flow to be processed. However, in practice, the data flow processing node generally does not exist alone, but exists in a program. The program generally includes a plurality of data flow processing nodes, so as to implement a more complete function than a single data flow processing node.

When a data flow processing node needs to be used for the data flow to be processed, only a corresponding data flow processing node in the program is used, and other data flow processing nodes in the program do not need to be started. This not only conserves the memory space and the processing capability in the process of processing the data flow to be processed and accelerates the processing of the data flow to be processed, but also avoids interference from other data flow processing nodes to the process of processing the data flow to be processed.

Therefore, in this embodiment, a program needs to be divided into a plurality of data flow processing nodes first, so that a corresponding data flow processing node can be selected from the data flow processing nodes based on the data processing requirements of a data flow to be processed.

In some optional implementations of this embodiment, determining, based on the data flow processing instruction, at least one data flow processing node corresponding to the above-mentioned data flow to be processed may include the following steps:

First step: Acquire a data flow processing instruction corresponding to the above-mentioned data flow to be processed.

After the data flow to be processed is acquired, the data flow processing instruction corresponding to the data flow to be processed needs to be further acquired, and how to process the data flow to be processed is determined based on the data flow processing instruction. The above-mentioned data flow processing instruction is used for instructing to convert the above-mentioned data flow to be processed into a target data flow. The data flow processing instruction is generally sent from a data processor of a server or driverless vehicle.

Second step: Determine the data flow processing node based on a target data flow corresponding to the above-mentioned data flow processing instruction.

The data flow processing instruction is used for instructing to convert the data flow to be processed into a target data flow. Generally, to convert the data flow to be processed into the target data flow, a plurality of steps is needed. Each step may be implemented by a corresponding data flow processing node. In this way, the data flow processing node can be determined based on the data flow processing instruction.

In some optional implementations of this embodiment, determining, based on the data flow processing instruction, the passing order in which the above-mentioned data flow to be processed passes through the above-mentioned at least one data flow processing node may include the following steps:

First step: Determine at least one data flow processing procedure from the above-mentioned data flow to be processed to the above-mentioned target data flow.

The data flow processing instruction instructs to convert the data flow to be processed into the target data flow. Generally, to convert the data flow to be processed into the target data flow, a plurality of data flow processing procedures is needed. The above-mentioned data flow processing procedures are used for converting the above-mentioned data flow to be processed into the above-mentioned specified data flow.

Second step: Determine, based on the above-mentioned data flow processing procedure, the passing order in which the above-mentioned data flow to be processed passes through the above-mentioned at least one data flow processing node.

Each data flow processing procedure generally corresponds to a specific input data flow and a specific output data flow. In this way, data flow processing nodes can be determined based on the data flow processing procedure, and further the passing order in which the data flow to be processed passes through the data flow processing nodes is determined.

In practice, the data flow processing nodes may be distributed in different programs. In order to use these data flow processing nodes, corresponding data flow guiding flag bits need to be set for these data flow processing nodes. The data flow guiding flag bit is used for importing the data flow into the data flow processing node or exporting the data flow from the data flow processing node. The data flow guiding flag bit may be controlled by a program. When a data flow processing node is needed, a data flow guiding flag bit is set for the data flow processing node. When the data flow processing node is not needed, the corresponding data flow guiding flag bit is deleted.

In some optional implementations of this embodiment, this embodiment further includes: a step of setting a data flow guiding flag bit for the above-mentioned data flow processing node. The step of setting a data flow guiding flag bit for the above-mentioned data flow processing node includes: setting a data flow input guiding flag bit and a data flow output guiding flag bit respectively at a data input port and a data output port of the above-mentioned data flow processing node, the above-mentioned data flow input guiding flag bit being used for indicating description information of the above-mentioned data flow processing node, and the above-mentioned data flow output guiding flag bit being used for querying the description information of the data flow processing node.

After the data flow processing node is determined, a data flow input guiding flag bit and a data flow output guiding flag bit are set respectively at the data input port and the data output port of the above-mentioned data flow processing node. The data flow input guiding flag bit not only has a function of importing the data flow into the data flow processing node, but also has a function of identifying, based on the description information of the data flow processing node, the data flow that will enter the data flow processing node and providing a prompt. Similarly, the data flow output guiding flag bit is not only used for exporting the output data flow from the data flow processing node, but also can be used for checking description information of a next data flow processing node to determine whether the data flow processing node is the one that should be connected.

Step 202, connect together the above-mentioned at least one data flow processing node according to the above-mentioned passing order to obtain a data flow processing channel, and import the above-mentioned data flow to be processed to the above-mentioned data flow processing channel for data processing.

To convert the data flow to be processed into the target data flow, the data flow to be processed needs to be processed according to a certain procedure. As can be known from the foregoing descriptions, each conversion of the data flow to be processed may be implemented by a data flow processing node. Therefore, after the data flow processing nodes are obtained, the data flow processing nodes are connected together according to the passing order to constitute a data flow processing channel corresponding to the data flow to be processed. After the data flow to be processed is imported into the data flow processing channel, the data flow to be processed sequentially passes through the data flow processing nodes according to the data flow processing procedure, and finally the target data flow is obtained. As can be known from the foregoing descriptions, the data flow processing channel has only one entrance and one exit, and the data flow to be processed in the data flow processing channel is not vulnerable to interference, so that the stability, security, and anti-interference ability of the data processing process are improved.

In some optional implementations of this embodiment, connecting together the above-mentioned at least one data flow processing node according to the above-mentioned passing order to obtain the data flow processing channel may include: connecting together data flow processing nodes corresponding to the above-mentioned data flow processing procedure using the above-mentioned data flow guiding flag bit according to the above-mentioned passing order to obtain the data flow processing channel.

After the data processing order is determined, the data flow processing channel can be obtained by connecting together the data flow processing nodes according to the passing order using the above-mentioned data flow guiding flag bit.

As can be known from the foregoing descriptions, in this embodiment, a corresponding data flow processing channel is constructed for the data flow to be processed based on the data flow processing instruction, so that the data flow to be processed can be processed more flexibly. The data flow processing node in this embodiment is a necessary node for processing the data flow to be processed. Because the interference of other data flow processing nodes to the data flow to be processed is prevented, the effectiveness of the data flow processing node is improved, the data processing capability and the space occupied for data processing are saved (for example, memory space is saved), the data processing is accelerated, and the anti-interference ability of the process of processing the data flow to be processed is improved.

Figure 3:
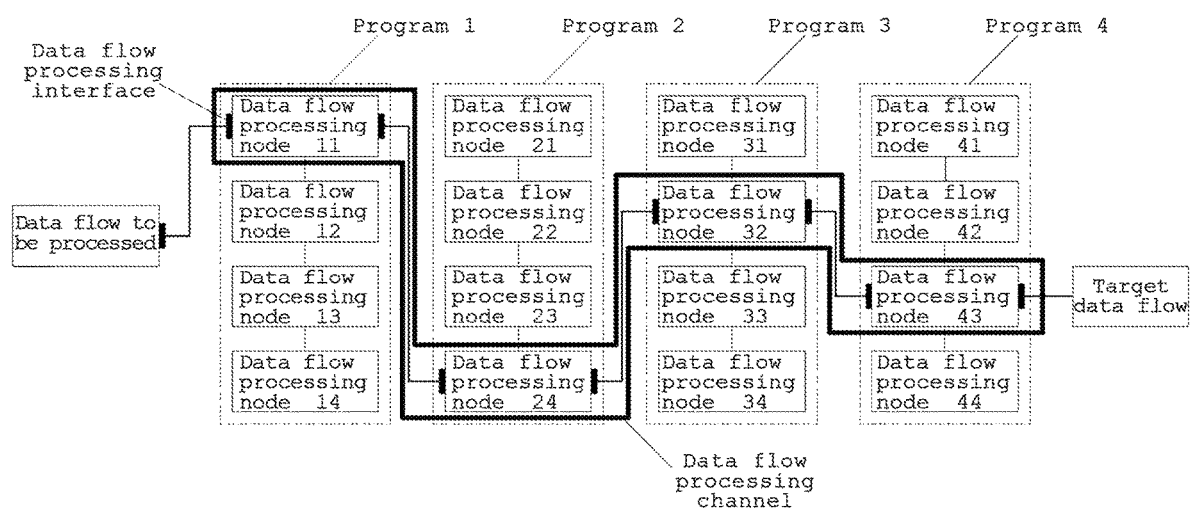
FIG. 3 is a schematic diagram of an application scenario of a data flow processing method for a data flow system according to an embodiment of the present application.

Further referring to FIG. 3, a schematic diagram of an application scenario of a data flow processing method for a data flow system according to this embodiment is shown. It can be seen from FIG. 3 that before a data flow to be processed is processed, programs 1 to 4 are each divided into a plurality of data flow processing nodes; then, required data flow processing nodes are determined based on a data flow processing instruction, the required data flow processing nodes including a data flow processing node 11, a data flow processing node 24, a data flow processing node 32, and a data flow processing node 43; afterward, a data flow guiding flag bit is set for each of the data flow processing node 11, the data flow processing node 24, the data flow processing node 32, and the data flow processing node 43, and the data flow guiding flag bits corresponding to the data flow processing node 11, the data flow processing node 24, the data flow processing node 32, and the data flow processing node 43 are connected together based on data processing steps to constitute a data flow processing channel, as shown in FIG. 3. Different data flow processing nodes may be selected for different data flows to be processed and different target data flows, so that the data flow to be processed can be processed in a more targeted and flexible manner. The data flow processing nodes are connected via the data flow guiding flag bits. The data flow input guiding flag bit of the data flow guiding flag bit not only has a function of importing the data flow into the data flow processing node, but also has a function of identifying, based on the description information of the data flow processing node, the data flow that will enter the data flow processing node and providing a prompt. The data flow output guiding flag bit of the data flow guiding flag bit is not only used for exporting the output data flow from the data flow processing node, but also can be used for checking the description information of a next data flow processing node to determine whether the data flow processing node is the one that should be connected. The data flow processing channel has only one data input port and one data output port, so that the anti-interference ability of the data flow to be processed is improved.

According to the data flow processing method for a data flow system provided by the present application, at least one data flow processing node for a data flow to be processed and a passing order in which the data flow to be processed passes through the at least one data flow processing node are determined first; then, the at least one data flow processing node is connected together according to above-mentioned passing order to obtain a data flow processing channel. In this way, corresponding data flow processing nodes can be connected based on the requirements of the data flow to be processed, thereby improving the utilization of data flow processing nodes and the data flow processing efficiency.

Figure 4:
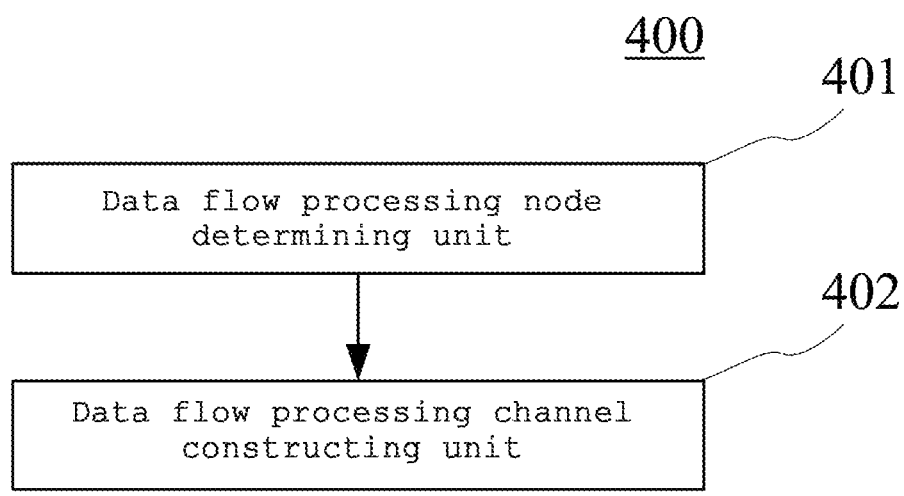
FIG. 4 is a schematic structural diagram of a data flow processing apparatus for a data flow system according to an embodiment of the present application.

Further referring to FIG. 4, as an implementation of the methods shown in the above-mentioned figures, the present application provides an embodiment for a data flow processing apparatus for a data flow system. This apparatus embodiment corresponds to the method embodiment shown in FIG. 2. The apparatus may be specifically applied to various electronic devices.

As shown in FIG. 4, this embodiment provides a data flow processing apparatus 400 for a data flow system. The data flow system includes a set of data flow processing nodes used for processing a data flow, and the above-mentioned data flow enters a data flow processing node in the set of data flow processing nodes acting as an entrance and exits the above-mentioned data flow system after passing through at least one data flow processing node in the set of data flow processing nodes. The apparatus 400 may include: a data flow processing node determining unit 401 and a data flow processing channel constructing unit 402. The data flow processing node determining unit 401 is used for acquiring a data flow to be processed, and determining, based on a data flow processing instruction, at least one data flow processing node corresponding to the above-mentioned data flow to be processed and a passing order in which the above-mentioned data flow to be processed passes through the above-mentioned at least one data flow processing node. The above-mentioned data flow processing node is used for converting the above-mentioned data flow to be processed into a designated data flow. The above-mentioned data flow processing instruction is used for instructing to convert the above-mentioned data flow to be processed into a target data flow. The data flow processing channel constructing unit 402 is used for connecting together the above-mentioned at least one data flow processing node according to the above-mentioned passing order to obtain a data flow processing channel, and importing the above-mentioned data flow to be processed to the above-mentioned data flow processing channel for data processing.

In some optional implementations of this embodiment, the above-mentioned data flow processing node determining unit 401 may include: a data flow processing instruction acquiring subunit (not shown in the figure) and a data flow processing node determining subunit (not shown in the figure). The data flow processing instruction acquiring subunit is used for acquiring a data flow processing instruction corresponding to the above-mentioned data flow to be processed. The data flow processing node determining subunit is used for determining the data flow processing node based on a target data flow corresponding to the above-mentioned data flow processing instruction.

In some optional implementations of this embodiment, the above-mentioned data flow processing node determining unit may include: a data flow processing procedure determining subunit (not shown in the figure) and a data flow processing node determining subunit (not shown in the figure). The data flow processing procedure determining subunit is used for determining at least one data flow processing procedure from the above-mentioned data flow to be processed to the above-mentioned target data flow, the above-mentioned data flow processing procedure being used for converting the above-mentioned data flow to be processed into the above-mentioned designated data flow. The data flow processing node determining subunit is used for determining data flow processing nodes corresponding to the above-mentioned data flow processing procedure.

In some optional implementations of this embodiment, the data flow processing apparatus 400 for the data flow system further includes: a data flow guiding flag bit setting unit (not shown in the figure), for setting a data flow guiding flag bit for the above-mentioned data flow processing node. The above-mentioned data flow guiding flag bit setting unit includes: a data flow guiding flag bit setting subunit (not shown in the figure), for setting a data flow input guiding flag bit and a data flow output guiding flag bit respectively at a data input port and a data output port of the above-mentioned data flow processing node, the above-mentioned data flow input guiding flag bit being used for indicating description information of the data flow processing node, and the above-mentioned data flow output guiding flag bit being used for querying the description information of the data flow processing node.

In some optional implementations of this embodiment, the above-mentioned data flow processing channel constructing unit 402 may include: a data flow processing channel constructing subunit, for connecting together data flow processing nodes corresponding to the above-mentioned data flow processing procedure using the above-mentioned data flow guiding flag bit according to the above-mentioned passing order to obtain the data flow processing channel.

Figure 5:
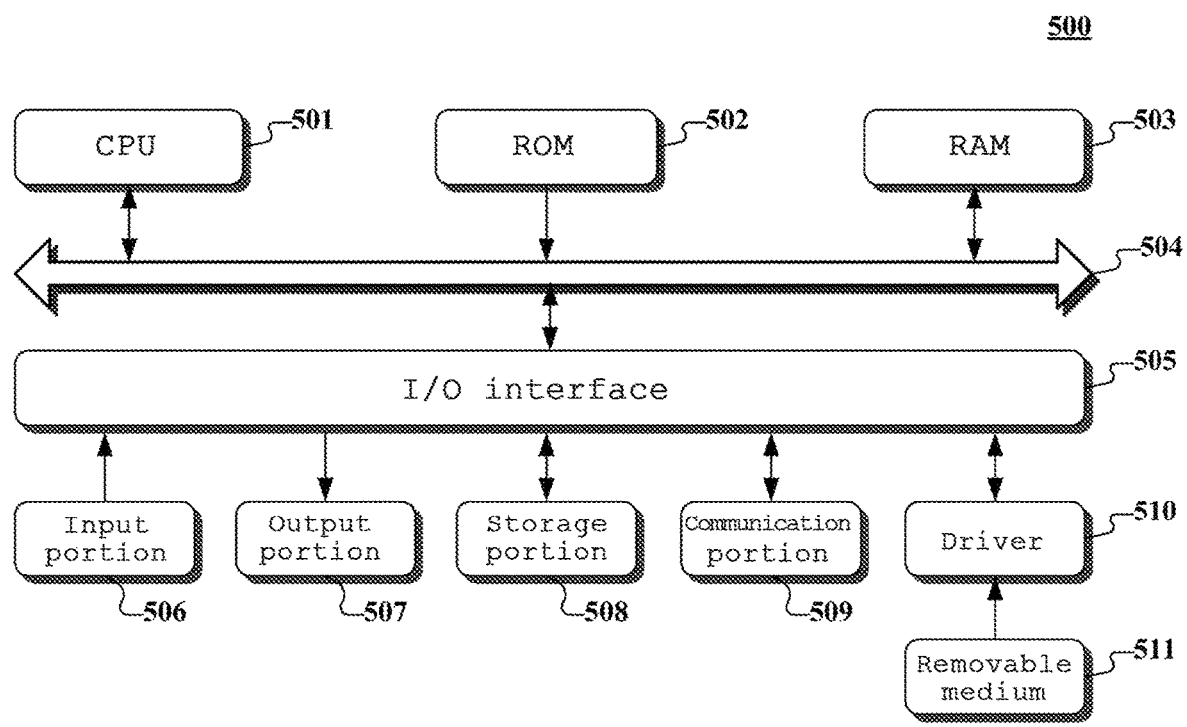
FIG. 5 is a schematic structural diagram of a server according to an embodiment of the present application.

Referring to FIG. 5, a schematic structural diagram of a computer system 500 adapted to implement a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 509, and/or may be installed from the removable media 511.

The flow charts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion.

The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a data flow processing node determining unit and a data flow processing channel constructing unit, where the names of these units or modules are not considered as a limitation to the units or modules. For example, the data flow processing channel constructing unit may also be described as "a unit for constructing a data flow processing channel".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to: acquire a to-be-processed data flow, and determine, based on a data flow processing instruction, at least one data flow processing node corresponding to the to-be-processed data flow and a passing order in which the to-be-processed data flow passes through the at least one data flow processing node, the data flow processing node converting the data flow into a designated data flow, and the data flow processing instruction instructing to convert the to-be-processed data flow into a target data flow; and connect together the at least one data flow processing node according to the passing order to obtain a data flow processing channel, and import the to-be-processed data flow to the data flow processing channel for data processing.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data flow processing method for a data flow system of an automatous driving vehicle, the data flow system comprising a set of data flow processing nodes for processing a data flow, and the data flow entering a data flow processing node in the set of data flow processing nodes acting as an entrance and exiting the data flow system after passing through at least one data flow processing node in the set of data flow processing nodes, the data flow processing method comprising:

acquiring a to-be-processed data flow, acquiring a data flow processing instruction corresponding to the to-be-processed data flow, determining at least one data flow processing node from a program comprising a plurality of data flow processing nodes according to a target data flow corresponding to the data flow processing instruction, and determining, based on the data flow processing instruction, a passing order in which the to-be-processed data flow passes through the at least one data flow processing node, the data flow processing node converting the data flow into a designated data flow, and the data flow processing instruction instructing to convert the to-be-processed data flow into the target data flow, the to-be-processed data flow comprising various data flows acquired by various sensors in the automatous driving vehicle; and connecting together the at least one data flow processing node according to the passing order to obtain a data flow processing channel, and importing the to-be-processed data flow to the data flow processing channel for data processing:

the method further comprising:

setting a data flow guiding flag bit for the data flow processing node, the setting the data flow guiding flag bit for the data flow processing node comprising:

setting a data flow input guiding flag bit and a data flow output guiding flag bit respectively at a data input port and a data output port of the data flow processing node, the data flow input guiding flag bit being used for indicating description information of the data flow processing node, and the data flow output guiding flag bit being used for querying the description information of the data flow processing node.

2. The method according to claim 1, wherein the determining, based on the data flow processing instruction, the passing order in which the to-be-processed data flow passes through the at least one data flow processing node comprises:

determining at least one data flow processing procedure from the to-be-processed data flow to the target data flow, the data flow processing procedure being used for converting the to-be-processed data flow into the designated data flow; and determining, based on the data flow processing procedure, the passing order in which the to-be-processed data flow passes through the at least one data flow processing node.

3. The method according to claim 1, wherein the connecting together the at least one data flow processing node according to the passing order to obtain a data flow processing channel comprises:

connecting together data flow processing nodes corresponding to the data flow processing procedure using the data flow guiding flag bit according to the passing order to obtain the data flow processing channel.

4. A data flow processing apparatus for a data flow system of an automatous driving vehicle, the data flow system comprising a set of data flow processing nodes for processing a data flow, and the data flow entering a data flow processing node in the set of data flow processing nodes acting as an entrance and exiting the data flow system after passing through at least one data flow processing node in the set of data flow processing nodes, the apparatus comprising:

at least one processor; and a memory storing instructions, the instructions when executed by the at least one processor, cause the at least one processor to perform operations, the operations comprising:

acquiring a to-be-processed data flow, acquiring a data flow processing instruction corresponding to the to-be-processed data flow, determining at least one data flow processing node from a program comprising a plurality of data flow processing nodes according to a target data flow corresponding to the data flow processing instruction, and determining, based on the data flow processing instruction, a passing order in which the to-be-processed data flow passes through the at least one data flow processing node, the data flow processing node converting the data flow into a designated data flow, and the data flow processing instruction instructing to convert the to-be-processed data flow into the target data flow, the to-be-processed data flow comprising various data flows acquired by various sensors in the automatous driving vehicle; and connecting together the at least one data flow processing node according to the passing order to obtain a data flow processing channel, and importing the to-be-processed data flow to the data flow processing channel for data processing;

the operations further comprising:

setting a data flow guiding flag bit for the data flow processing node, the setting the data flow guiding flag bit for the data flow processing node comprising:

setting a data flow input guiding flag bit and a data flow output guiding flag bit respectively at a data input port and a data output port of the data flow processing node, the data flow input guiding flag bit being used for indicating description information of the data flow processing node, and the data flow output guiding flag bit being used for querying the description information of the data flow processing node.

5. The apparatus according to claim 4, wherein the determining, based on the data flow processing instruction, the passing order in which the to-be-processed data flow passes through the at least one data flow processing node comprises:

determining at least one data flow processing procedure from the to-be-processed data flow to the target data flow, the data flow processing procedure being used for converting the to-be-processed data flow into the designated data flow; and determining, based on the data flow processing procedure, the passing order in which the to-be-processed data flow passes through the at least one data flow processing node.

6. The apparatus according to claim 4, wherein the connecting together the at least one data flow processing node according to the passing order to obtain a data flow processing channel comprises:

connecting together data flow processing nodes corresponding to the data flow processing procedure using the data flow guiding flag bit according to the passing order to obtain the data flow processing channel.

7. A non-transitory storage medium storing one or more programs, the one or more programs when executed by a device, causing the device to perform a data flow processing method for a data flow system of an automatous driving vehicle, the data flow system comprising a set of data flow processing nodes for processing a data flow, and the data flow entering a data flow processing node in the set of data flow processing nodes acting as an entrance and exiting the data flow system after passing through at least one data flow processing node in the set of data flow processing nodes, the data flow processing method comprising:

acquiring a to-be-processed data flow, acquiring a data flow processing instruction corresponding to the to-be-processed data flow, determining at least one data flow processing node from a program comprising a plurality of data flow processing nodes according to a target data flow corresponding to the data flow processing instruction, and determining, based on the data flow processing instruction, a passing order in which the to-be-processed data flow passes through the at least one data flow processing node, the data flow processing node converting the data flow into a designated data flow, and the data flow processing instruction instructing to convert the to-be-processed data flow into the target data flow, the to-be-processed data flow comprising various data flows acquired by various sensors in the automatous driving vehicle; and connecting together the at least one data flow processing node according to the passing order to obtain a data flow processing channel, and importing the to-be-processed data flow to the data flow processing channel for data processing;

the operations further comprising:

setting a data flow guiding flag bit for the data flow processing node, the setting the data flow guiding flag bit for the data flow processing node comprising:

setting a data flow input guiding flag bit and a data flow output guiding flag bit respectively at a data input port and a data output port of the data flow processing node, the data flow input guiding flag bit being used for indicating description information of the data flow processing node, and the data flow output guiding flag bit being used for querying the description information of the data flow processing node.

* * * * *